US011084352B2

(12) United States Patent
Imaizumi

(10) Patent No.: US 11,084,352 B2
(45) Date of Patent: Aug. 10, 2021

(54) VEHICLE AIR CONDITIONER

(71) Applicant: Honda Motor Co., Ltd., Tokyo (JP)

(72) Inventor: Yuichiro Imaizumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 248 days.

(21) Appl. No.: 16/280,052

(22) Filed: Feb. 20, 2019

(65) Prior Publication Data
US 2019/0255908 A1 Aug. 22, 2019

(30) Foreign Application Priority Data

Feb. 22, 2018 (JP) .............................. JP2018-029527

(51) Int. Cl.
*B60H 1/00* (2006.01)
*B60H 1/34* (2006.01)

(52) U.S. Cl.
CPC ..... *B60H 1/00564* (2013.01); *B60H 1/00028* (2013.01); *B60H 1/00207* (2013.01); *B60H 1/3435* (2013.01); *B60H 2001/00085* (2013.01)

(58) Field of Classification Search
CPC ............ B60H 1/00564; B60H 1/00028; B60H 1/00207; B60H 1/3435; B60H 1/00057; B60H 2001/00085
USPC ....................................................... 454/155
See application file for complete search history.

(56) References Cited

U.S. PATENT DOCUMENTS

2014/0075974 A1\* 3/2014 Klein ................. B60H 1/00057
62/119

FOREIGN PATENT DOCUMENTS

| JP | H10109516 | 4/1998 |
| JP | 2005119639 | 5/2005 |
| JP | 2006525181 | 11/2006 |
| JP | 2009184493 | 8/2009 |
| JP | 2016145015 | 8/2016 |

OTHER PUBLICATIONS

"Office Action of Japan Counterpart Application," with English translation thereof, dated Aug. 28, 2019, p. 1-p. 6.

\* cited by examiner

*Primary Examiner* — Allen R Schult
(74) *Attorney, Agent, or Firm* — JCIPRNET

(57) ABSTRACT

A vehicle air conditioner includes: a heating passage for sucking in air inside the vehicle cabin with a heating fan and supplying the air to a condenser, and supplying the air having passed through the condenser into the vehicle cabin from a heating air outlet; a cooling passage for sucking in the air inside the vehicle cabin with a cooling fan and supplying the air to an evaporator, and supplying the air having passed through the evaporator into the vehicle cabin from a cooling air outlet; a cooling inlet opening and a cooling outlet opening capable of communicating both sides of the condenser of the heating passage with outside of the vehicle cabin; and a heating inlet opening and a heating outlet opening capable of communicating both sides of the evaporator of the cooling passage with the outside of the vehicle cabin.

2 Claims, 4 Drawing Sheets

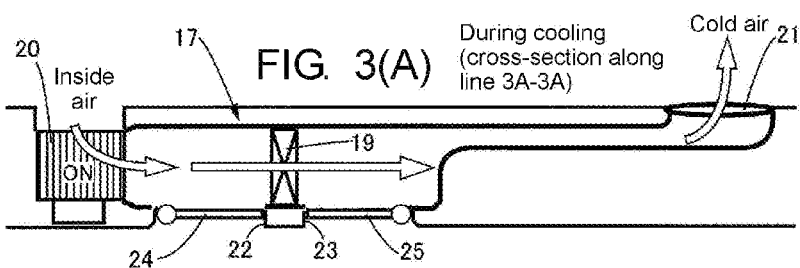
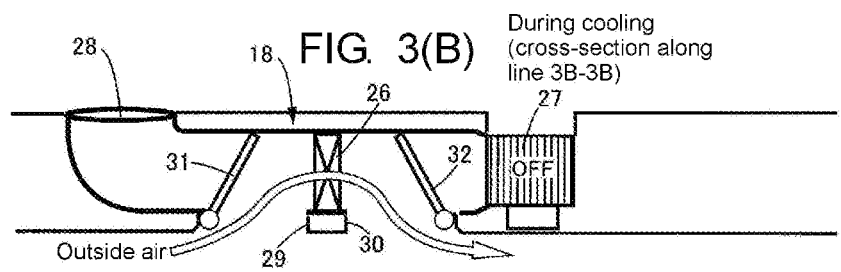
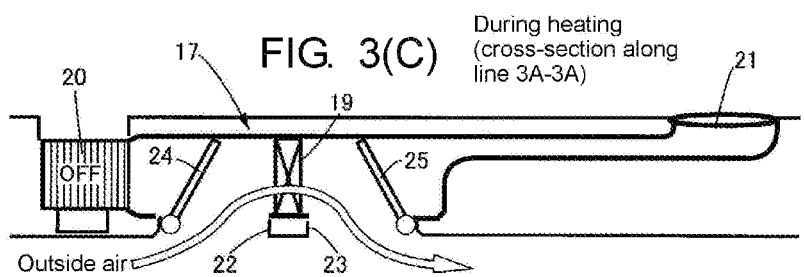
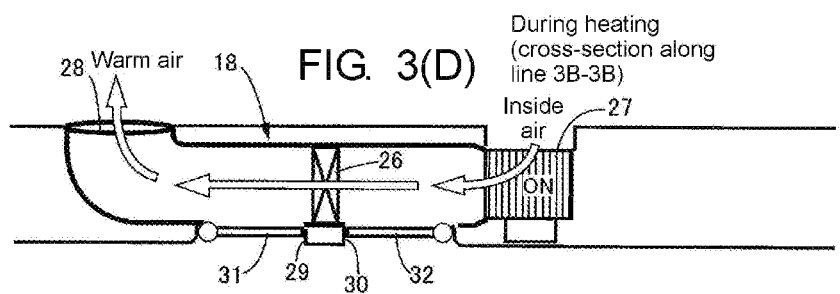

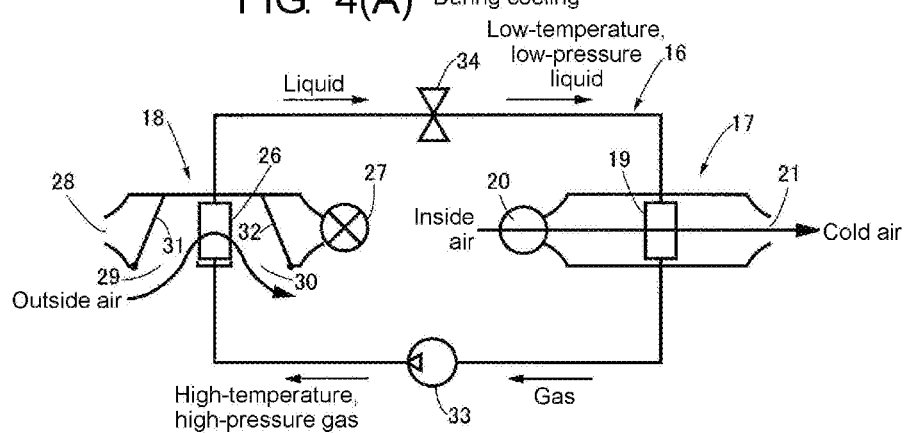
FIG. 4(A) During cooling
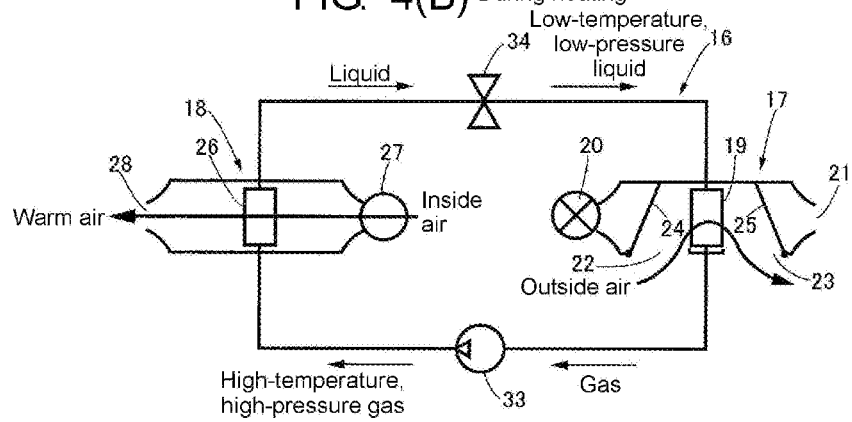
FIG. 4(B) During heating

VEHICLE AIR CONDITIONER

CROSS-REFERENCE TO RELATED APPLICATION

This application claims the priority benefit of Japan Application No. 2018-029527, filed on Feb. 22, 2018. The entirety of the above-mentioned patent application is hereby incorporated by reference herein and made a part of this specification.

BACKGROUND

Technical Field

The disclosure relates to a vehicle air conditioner, provided in a panel member such as a door that separates inside of a vehicle cabin from outside of the vehicle cabin and suitable for locally cooling and heating surroundings of an occupant inside the vehicle cabin.

Related Art

A seat air conditioner is well-known from the following Patent Document 1, wherein the air conditioner is provided at a lower part of a seat for a vehicle, and cooling is performed by supplying cold air from the air conditioner to the inside of the seat and heating is performed by supplying warm air from the air conditioner to the inside of the seat. This seat air conditioner is constituted by connecting a first heat exchanger 4, a compression machine 1, a second heat exchanger 2 and an expander 3 in a closed circuit in which a heat transfer medium circulates. During cooling, air inside a vehicle cabin is cooled by heat exchange with a low-temperature, low-pressure heat transfer medium in the first heat exchanger 4 and supplied to the inside of the seat, while a high-temperature, high-pressure heat transfer medium exchanges heat with the air inside the vehicle cabin in the second heat exchanger 2 so as to be cooled. In addition, during heating, the air inside the vehicle cabin is heated by heat exchange with the high-temperature, high-pressure heat transfer medium in the first heat exchanger 4 and supplied to the inside of the seat, while the low-temperature, low-pressure heat transfer medium exchanges heat with the air inside the vehicle cabin in the second heat exchanger 2 so as to be heated.

PATENT DOCUMENTS

Patent Document 1: Japanese Laid-open No. 2016-145015

In the above conventional seat air conditioner, during cooling, since the air whose temperature has been raised by exchanging heat with the high-temperature, high-pressure heat transfer medium in the second heat exchanger 2 is discharged from a rear part of the seat into the vehicle cabin, there is a problem that the temperature of the air around the seat may rise and the effect of cooling the seat deteriorates. Also, during heating, since the air whose temperature has been lowered by exchanging heat with the low-temperature, low-pressure heat transfer medium in the second heat exchanger 2 is discharged from the rear part of the seat into the vehicle cabin, there is a problem that the temperature of the air around the seat may drop and the effect of heating the seat deteriorates.

SUMMARY

A vehicle air conditioner is proposed, wherein a heating passage for sucking in air inside a vehicle cabin with a heating fan and supplying the air to a condenser, and supplying the air that has passed through the condenser into the vehicle cabin from a heating air outlet, a cooling passage for sucking in the air inside the vehicle cabin with a cooling fan and supplying the air to an evaporator, and supplying the air that has passed through the evaporator into the vehicle cabin from a cooling air outlet, a cooling inlet opening and a cooling outlet opening capable of communicating both sides of the condenser of the heating passage with outside of the vehicle cabin, and a heating inlet opening and a heating outlet opening capable of communicating both sides of the evaporator of the cooling passage with the outside of the vehicle cabin, are provided in a panel member that separates inside of the vehicle cabin from the outside of the vehicle cabin.

BRIEF DESCRIPTION OF THE DRAWINGS

FIG. 3(A) to FIG. 3(D) are cross-sectional views respectively taken on line 3A-3A and line 3B-3B in FIG. 1.

FIG. 4(A) and FIG. 4(B) are circuit diagrams of a heat transfer medium of an air conditioner.

DESCRIPTION OF THE EMBODIMENTS

Figure 1:
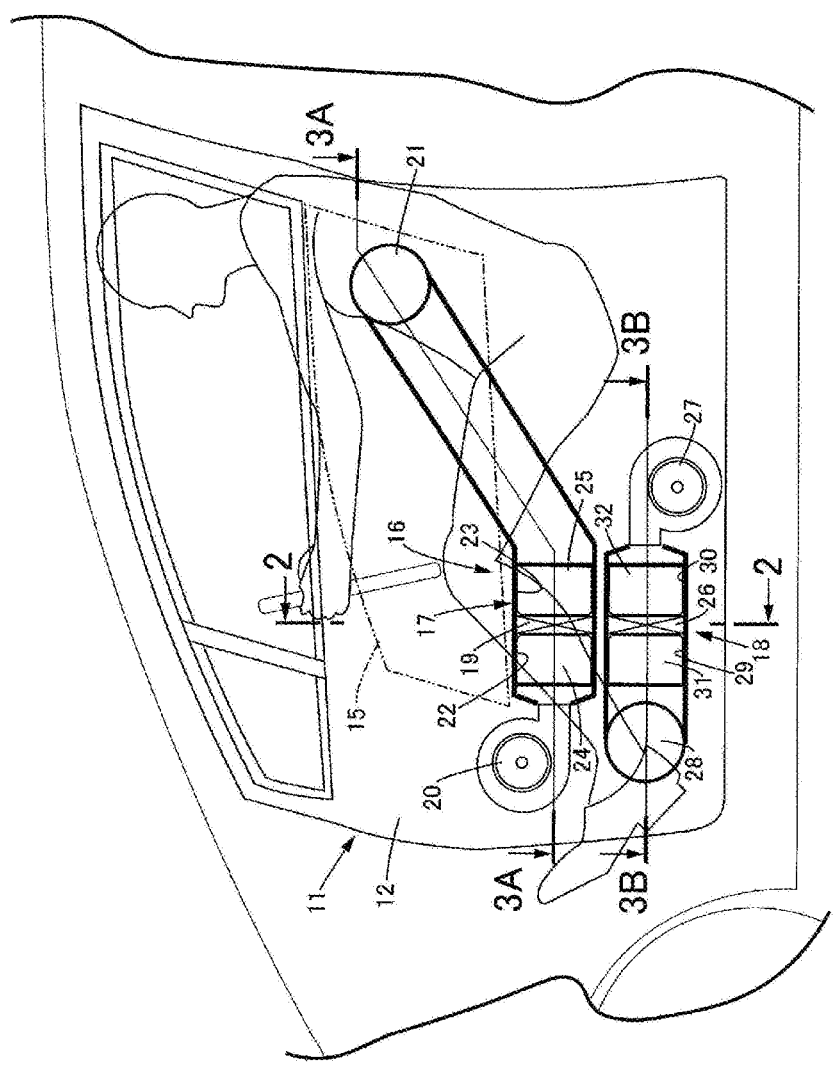
FIG. 1 is a side view of a door including an air conditioner.

The disclosure provides a vehicle air conditioner capable of efficiently cooling and heating a vehicle cabin.

According to an embodiment of the disclosure, a vehicle air conditioner is proposed in which, in addition to the above configuration, the panel member is a vehicle door.

According to another embodiment of the disclosure, a vehicle air conditioner is proposed in which, in addition to the above configuration, the heating air outlet is located below the cooling air outlet.

According to another embodiment of the disclosure, a vehicle air conditioner is proposed in which, in addition to any of the above configurations, the cooling inlet opening and the cooling outlet opening are opened and closed by a cooling flap respectively, and the heating inlet opening and the heating outlet opening are opened and closed by a heating flap respectively Moreover, a door of the embodiment corresponds to the panel member of the disclosure.

According to the above configurations, the heating passage for sucking in the air inside the vehicle cabin with the heating fan and supplying the air to the condenser, and supplying the air that has passed through the condenser into the vehicle cabin from the heating air outlet, the cooling passage for sucking in the air inside the vehicle cabin with the cooling fan and supplying the air to the evaporator, and supplying the air that has passed through the evaporator into the vehicle cabin from the cooling air outlet, the cooling inlet opening and the cooling outlet opening capable of communicating both sides of the condenser of the heating passage with the outside of the vehicle cabin, and the heating inlet opening and the heating outlet opening capable of communicating both sides of the evaporator of the cooling passage with the outside of the vehicle cabin, are provided in the panel member that separates the inside of the vehicle cabin from the outside of the vehicle cabin. Thus, both cooling and heating functions can be exhibited with one air conditioner without requiring a heat source such as high-temperature cooling water of an internal combustion engine.

Moreover, since outside air whose temperature has been raised by exchanging heat with the condenser during cooling is discharged outside the vehicle cabin from the cooling outlet opening, the cooling effect inside the vehicle cabin is not reduced; also, since the outside air whose temperature has been lowered by exchanging heat with the evaporator during heating is discharged outside the vehicle cabin from the heating outlet opening, the heating effect inside the vehicle cabin is not reduced. Therefore, the required cooling effect and heating effect can be obtained without increasing the size of the air conditioner.

In addition, when switching between cooling and heating, there is no need to use a channel switching valve to switch a heat transfer medium passage that connects the evaporator, the compression machine, the condenser and the expander, and it suffices if the air inside the vehicle cabin flows through the cooling passage and the outside air flows through the heating passage during cooling and if the air inside the vehicle cabin flows through the heating passage and the outside air flows through the cooling passage during heating. Thus, as compared with the case of switching the heat transfer medium passage with the channel switching valve, the air conditioner is simplified in structure.

According to the disclosure, since the panel member is a vehicle door, as compared with a case where the air conditioner is provided in a floor panel of the vehicle, water can be easily suppressed from entering the air conditioner from the cooling inlet opening, the cooling outlet opening, the heating inlet opening and the heating outlet opening.

According to the disclosure, since the heating air outlet is located below the cooling air outlet, the cooling effect can be improved by supplying cold air to an occupant's upper body and the heating effect can be improved by supplying warm air to the occupant's lower body.

According to the disclosure, since the cooling inlet opening and the cooling outlet opening are opened and closed by the cooling flap respectively, and the heating inlet opening and the heating outlet opening are opened and closed by the heating flap respectively, by opening the cooling flap during cooling, the outside air can be efficiently taken into the condenser as flowing air; by opening the heating flap during heating, the outside air can be efficiently taken into the evaporator as flowing air.

Figure 2:
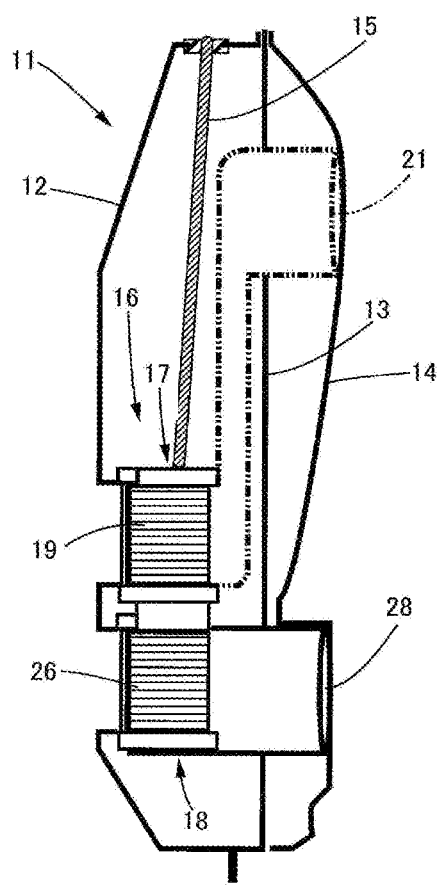
FIG. 2 is a cross-sectional view taken on line 2-2 in FIG. 1.

An embodiment of the disclosure is explained below based on FIG. 1 to FIG. 4(B).

As shown in FIG. 1 to FIG. 3(D), the door 11 on a front side, which is provided on a side part of a vehicle, includes an outer panel 12, an inner panel 13 joined to a side of the outer panel 12 facing a vehicle cabin, and a door trim 14 joined to a side of the inner panel 13 facing the vehicle cabin, and an elevatable door glass 15 is housed in a space between the outer panel 12 and the inner panel 13 in a descended state. Main parts of an air conditioner 16 capable of cooling and heating are installed in a lower front position in the space between the outer panel 12 and the inner panel 13, wherein the outer panel 12 and the inner panel 13 do not interfere with the descended door glass 15.

The air conditioner 16 includes an upper cooling passage 17 having a duct extending in a substantially front-rear direction and a lower heating passage 18 having a duct extending in the substantially front-rear direction. An evaporator 19 being a heat exchanger is disposed in a middle part of the cooling passage 17; a cooling fan 20 sucking in air inside the vehicle cabin and supplying the air to the evaporator 19 is provided at an upstream end of the cooling passage 17; and a cooling air outlet 21 blowing the air that has passed through the evaporator 19 into the vehicle cabin is provided on a downstream side of the cooling passage 17. The cooling air outlet 21 is formed to face the chest of an occupant who is seated so as to face a side surface of the door 11 facing the vehicle cabin. In addition, in a position immediately upstream of and a position immediately downstream of the evaporator 19 in the cooling passage 17, a heating inlet opening 22 and a heating outlet opening 23 which are formed to face the outer panel 12 and communicate with the outside of the vehicle cabin are respectively provided, wherein the heating inlet opening 22 and the heating outlet opening 23 are opened and closed respectively by heating flaps 24 and 25 operated by actuators (not shown).

The heating flap 24 for opening and closing the heating inlet opening 22 located on a front side of the cooling passage 17 opens inwardly in a vehicle width direction at a rear end with a hinge at a front end as a fulcrum. Moreover, the heating flap 25 for opening and closing the heating outlet opening 23 on a rear side of the cooling passage 17 opens inwardly in the vehicle width direction at a front end with a hinge at a rear end as a fulcrum. When the heating flaps 24 and 25 are opened, they block the cooling passage 17 in front of and behind the evaporator 19 (see FIG. 3(C)).

A condenser 26 being a heat exchanger is disposed in a middle part of the heating passage 18; a heating fan 27 sucking in the air inside the vehicle cabin and supplying the air to the condenser 26 is provided at an upstream end of the heating passage 18; and a heating air outlet 28 blowing the air that has passed through the condenser 26 into the vehicle cabin is provided on a downstream side of the heating passage 18. The heating air outlet 28 are formed to face the feet of the occupant who is seated so as to face the side surface of the door 11 facing the vehicle cabin. In addition, in a position immediately downstream of and a position immediately upstream of the condenser 26 in the heating passage 18, a cooling inlet opening 29 and a cooling outlet opening 30 which are formed to face the outer panel 12 and communicate with the outside of the vehicle cabin are respectively provided, wherein the cooling inlet opening 29 and the cooling outlet opening 30 are opened and closed respectively by cooling flaps 31 and 32 operated by actuators (not shown).

The cooling flap 31 for opening and closing the cooling inlet opening 29 located on a front side of the heating passage 18 opens inwardly in the vehicle width direction at a rear end with a hinge at a front end as a fulcrum. Moreover, the cooling flap 32 for opening and closing the cooling outlet opening 30 on a rear side of the heating passage 18 opens inwardly in the vehicle width direction at a front end with a hinge at a rear end as a fulcrum. When the cooling flaps 31 and 32 are opened, they block the heating passage 18 in front of and behind the condenser 26 (see FIG. 3 (B)).

FIG. 4(A) and FIG. 4(B) show a circuit for circulating a heat transfer medium such as Freon which functions as a refrigerant or heat medium of the air conditioner 16. A compression machine 33 composed of a compressor is disposed in a passage through which the heat transfer medium flows from the evaporator 19 to the condenser 26; an expander 34 composed of an expansion valve is disposed in a passage through which the heat transfer medium flows from the condenser 26 to the evaporator 19.

As shown in FIG. 4(A), during cooling operation of the air conditioner 16, the air sucked in by the cooling fan 20 from inside the vehicle cabin is supplied to the evaporator 19, and the air that has passed through the evaporator 19 is supplied into the vehicle cabin from the cooling air outlet 21. At this moment, the cooling flaps 31 and 32 are opened with the heating fan 27 of the heating passage 18 stopped, and the air outside the vehicle cabin, which is sucked into the heating passage 18 from the cooling inlet opening 29, passes through the condenser 26 and is discharged outside the vehicle cabin from the cooling outlet opening 30.

As shown in FIG. 4(B), during heating operation of the air conditioner 16, the air sucked in by the heating fan 27 from inside the vehicle cabin is supplied to the condenser 26, and the air that has passed through the condenser 26 is supplied into the vehicle cabin from the heating air outlet 28. At this moment, the heating flaps 24 and 25 are opened with the cooling fan 20 of the cooling passage 17 stopped, and the air outside the vehicle cabin, which is sucked into the cooling passage 17 from the heating inlet opening 22, passes through the evaporator 19 and is discharged outside the vehicle cabin from the heating outlet opening 23.

Next, effects of the embodiment of the disclosure including the above configuration are explained.

During the cooling operation of the air conditioner 16 shown in FIG. 4(A), the heat transfer medium functions as a refrigerant, and the refrigerant compressed by the compression machine 33 and turned into a high-temperature, high-pressure gas is supplied to the condenser 26 where it exchanges heat with relatively low-temperature outside air and is liquefied. The liquefied refrigerant passes through the expander 34 and expands to become a low-temperature, low-pressure liquid and is supplied to the evaporator 19 in the cooling passage 17. Then, the air inside the vehicle cabin, which is sucked into the cooling passage 17 by the cooling fan 20, passes through the evaporator 19, thereby exchanging heat with the low-temperature, low-pressure refrigerant, and becomes cold air and is blown out from the cooling air outlet 21, thereby cooling the inside of the vehicle cabin. The refrigerant that has passed through the evaporator 19 vaporizes into a gas, and is again supplied to the compression machine 33.

During the heating operation of the air conditioner 16 shown in FIG. 4(B), the heat transfer medium functions as a heating medium, and the heat medium compressed by the compression machine 33 and turned into a high-temperature, high-pressure gas is supplied to the condenser 26. The air inside the vehicle cabin, which is sucked into the heating passage 18 by the heating fan 27, passes through the condenser 26, thereby exchanging heat with the high-temperature, high-pressure heating medium, and becomes warm air and is blown out from the heating air outlet 28, thereby heating the inside of the vehicle cabin. The heat medium that has passed through the condenser 26 is liquefied into a liquid and supplied to the expander 34, passes through the expander 34 and expands to become a low-temperature, low-pressure liquid, and is supplied to the evaporator 19 in the cooling passage 17. Then, the heat medium vaporized by exchanging heat with relatively high-temperature outside air in the evaporator 19 is again supplied to the compression machine 33.

In a vehicle using an internal combustion engine as a driving source for traveling, high-temperature cooling water of the internal combustion engine is used as a heat source for heating. Since the air conditioner 16 of the present embodiment enables both the heating operation and the cooling operation without requiring the high-temperature cooling water, the air conditioner 16 is suitable for an electric vehicle using an electric motor instead of an internal combustion engine as the driving source for traveling.

During cooling, the outside air introduced from the cooling inlet opening 29 of the heating passage 18 passes through the condenser 26 and rises in temperature. Since the air whose temperature has risen is discharged outside the vehicle cabin from the cooling outlet opening 30 without being discharged into the vehicle cabin, the cooling performance inside the vehicle cabin is not affected (see FIG. 4(A)). Similarly, during heating, the outside air introduced from the heating inlet opening 22 of the cooling passage 17 passes through the evaporator 19 and drops in temperature. Since the air whose temperature has dropped is discharged outside the vehicle cabin from the heating outlet opening 23 without being discharged into the vehicle cabin, the heating performance inside the vehicle cabin is not affected (see FIG. 4(B)).

In addition, in the air conditioner described in Patent Document 1 mentioned above, since the cold air to be supplied to the seat during cooling and the warm air to be supplied to the seat during heating are generated by the same first heat exchanger 4, it is necessary to use a channel switching valve to switch the heat transfer medium passage that connects the first heat exchanger 4, the compression machine 1, the second heat exchanger 2 and the expander 3, and there is a problem that the structure becomes complex due to addition of the channel switching valve or piping. On the other hand, in the air conditioner 16 of the present embodiment, by flowing the air inside the vehicle cabin through the cooling passage 17 and flowing the outside air through the heating passage 18 during cooling as well as flowing the air inside the vehicle cabin through the heating passage 18 and flowing the outside air through the cooling passage 17 during heating, the evaporator 19 of the cooling passage 17 exclusively generates the cold air for cooling, and the condenser 26 of the heating passage 18 exclusively generates the warm air for heating. As a result, the air conditioner 16 of the present embodiment eliminates the need for the channel switching valve for switching the heat transfer medium passage or piping, and the structure is simplified as compared with the air conditioner described in Patent Document 1 mentioned above. Not only the cost or the weight is reduced but also heat loss or pressure loss is reduced.

In addition, since the air conditioner 16 is disposed inside the door 11, as compared with the case where the air conditioner 16 is disposed inside a member located at a low position, such as a floor panel or the like, the height of the cooling inlet opening 29, the cooling outlet opening 30, the heating inlet opening 22 and the heating outlet opening 23 from the road surface can be sufficiently secured, and water can be easily prevented from entering the air conditioner 16.

In addition, since the heating air outlet 28 for supplying warm air heated by the air conditioner 16 into the vehicle cabin is disposed in a position lower than the cooling air outlet 21 for supplying cold air cooled by the air conditioner 16 into the vehicle cabin, the cooling effect can be improved by supplying the cold air to the occupant's upper body and the heating effect can be improved by supplying the warm air to the occupant's lower body. In this way, the air conditioner 16 not only cools or heats the entire inside of the vehicle cabin but cools or heats concentratedly only surroundings of the occupant seated in the vicinity of the air conditioner 16. Thus, the air conditioner 16 can be downsized and the cost and energy consumption can be reduced. Moreover, since there is no need to concentratedly dispose an air conditioner inside a dashboard, the dashboard can be downsized and the space in front of a front seat occupant can be expanded.

The above has explained the embodiments of the disclosure. However, various design changes can be made within a scope not departing from the gist of the disclosure.

For example, the panel member of the disclosure is not limited to the door 11 on the front side of the embodiment, but may be other member such as a door on a rear side, a tailgate, a roof panel, a floor panel or the like

What is claimed is:

1. A vehicle air conditioner, wherein
a heating passage for sucking in air inside a vehicle cabin with a heating fan and supplying the air to a condenser, and supplying the air that has passed through the condenser into the vehicle cabin from a heating air outlet,
a cooling passage for sucking in the air inside the vehicle cabin with a cooling fan and supplying the air to an evaporator, and supplying the air that has passed through the evaporator into the vehicle cabin from a cooling air outlet,
a cooling inlet opening and a cooling outlet opening capable of communicating both sides of the condenser of the heating passage with outside of the vehicle cabin, are provided in a panel member that separates inside of the vehicle cabin from the outside of the vehicle cabin, and
a heating inlet opening and a heating outlet opening capable of communicating both sides of the evaporator of the cooling passage with the outside of the vehicle cabin, are provided in the panel member,
wherein the heating air outlet is located below the cooling air outlet in the panel member,
wherein the cooling inlet opening and the cooling outlet opening are opened and closed by at least two cooling flaps, and the heating inlet opening and the heating outlet opening are opened and closed by at least two heating flaps,
the heating passage is closed and the condenser is exposed to an outside of the vehicle cabin by opening the cooling flaps inwardly in a vehicle width direction, and
the cooling passage is closed and the evaporator is exposed to the outside of the vehicle cabin by opening the heating flaps inwardly in the vehicle width direction.

2. The vehicle air conditioner according to claim 1, wherein the panel member is a vehicle door.

* * * * *